United States Patent [19]
Hynecek

[11] Patent Number: 4,878,121
[45] Date of Patent: Oct. 31, 1989

[54] IMAGE SENSOR ARRAY FOR STILL CAMERA IMAGING WITH MULTIPLEXER FOR SEPARATING INTERLACED FIELDS

[75] Inventor: Jaroslva Hynecek, Richardson, Tex.

[73] Assignee: Texas Instruments Incorporated, Dallas, Tex.

[21] Appl. No.: 71,447

[22] Filed: Jul. 9, 1987

[51] Int. Cl.⁴ ............................................. H04N 5/335
[52] U.S. Cl. .............................. 358/213.22; 358/909; 358/213.26
[58] Field of Search ........................ 358/213.23, 213.25, 358/213.26, 909, 44, 213.22

[56] References Cited

U.S. PATENT DOCUMENTS 4,635,122  1/1987  Kato et al. ...................... 358/213.26

FOREIGN PATENT DOCUMENTS 181274  11/1982  Japan ............................... 358/213.26
211384  11/1984  Japan ............................... 358/213.26
199280  10/1985  Japan ............................... 358/213.26

OTHER PUBLICATIONS

Horii et al., "A New Configuration of CCD Imager with a Very Low Smear Level—FIT-CCD Imager", IEEE Trans. on Electron Devices, vol. 31, No. 7, Jul. 1984.

Primary Examiner—James J. Groody
Assistant Examiner—Robert M. Bauer
Attorney, Agent, or Firm—George L. Craig; Thomas R. Fitzgerald; Melvin Sharp

[57] ABSTRACT

A CCD imager (10) is adaptable for recording a still image and translating the still image into a NTSC television format. An image array (12) of the imager (10) has a plurality of cells arranged in rows and columns (35-37). The cells are further divided into a plurality of fields including a first field and a second field, cells in any one row belong to a single field. A memory array (16) of the imager comprises a plurality of memory cells (128, 130, 82, 84, 174, 176, 152 and 154) including first cells (128, 82, 174, 152) for storing signals from the first field, and second cells (130, 84, 176, 54) for storing signals from the second field. A transferor (14) is operable to transfer the first field signals to the first memory cells (128, 174, 152), and also transfers the second field signals to the second memory cells (130, 84, 176, 154). A readout circuit (18-32) reads out the first field signals from the first memory cells (128, 82, 174, 152) during a first period, and reads out the second field signals from the second memory cells (130, 84, 176, 154) during a second period following the first period.

26 Claims, 3 Drawing Sheets

IMAGE SENSOR ARRAY FOR STILL CAMERA IMAGING WITH MULTIPLEXER FOR SEPARATING INTERLACED FIELDS

TECHNICAL FIELD OF THE INVENTION

The present invention relates in general to image sensors, and relates more particularly to high-resolution image sensors adapted for still-image recording.

BACKGROUND OF THE INVENTION

In the NTSC (National Television Standards Committee) television system, the television picture adapted for solid state sensors is comprised by a plurality of image pixels arranged in horizontal parallel rows 1-n. The image is divided into a field "A" and a field "B". Lines 1, 3, 5, etc. are first scanned and displayed in a field "A". After field "A" has been scanned, alternating lines 2, 4, 6, etc. are scanned and displayed in a field "B". Field "A" is said to be interlaced with field "B".

For compatibility reasons, the NTSC scanning method has been carried over to the still picture recording scheme. In this recording scheme, the horizontal lines from field "A" are stored in a suitable storing device such as a magnetic disc, and then the lines from field "B" are scanned and stored. The alternate field recording scheme, although satisfactory for TV camera operation, presents a problem for still picture recording.

The time separation of field "A" and field "B" in the above recording scheme creates a difficulty when an image sensor attempts to record a scene after the manner of still photography. To simulate still photography, it is necessary to take the exposure of both fields at the same time. However, for compatibility with the NTSC system and still picture storing method, the field "A" must be separately stored in the sensor, i.e., the device, from field "B" to facilitate the time sequential NTSC compatible display.

A number of designs have recently appeared in the industry to accomplish the task of making still image recording compatible with the NTSC TV system. One recent frame transfer device has a CCD imager array, an adjacent CCD memory array large enough to store both fields "A" and "B", and one-half of a CCD memory array separated by a serial readout register for the field "A" for storing field "B". The "B" field memory has its own serial readout register adjacent to it. In this frame transfer array scheme, both fields "A" and "B" are first transferred to the first memory and the line readout thereafter begins. A field "A" line is read from the first memory array, and a field "B" line is transferred through the readout register to the second, half-memory array for later readout. Fields "A" and "B" may then be read out independently while they were exposed simultaneously.

In the described device, the field "B" information must be stored in the two different locations, first in the full field memory A and B and thereafter in the half-memory B. This results in an excessively large device size that is accompanied with high device fabrication cost.

Another recent device employs an interline transfer image array and a full field memory located adjacent to the image area. In this device it is possible to transfer the lines of field "A" to the memory first and then the lines of the field "B". This results, however, in a time-delayed exposure for field "B" respective to field "A" which in turn presents a problem in recording the still pictures of imaged objects.

Conventional interline image sensors suffer from low resolution and less light sensitivity.

In view of the above, a need has arisen in the industry for a high resistivity, high-resolution image sensor that takes the same exposure for both fields at the same time and does not suffer from an inefficient utilization of the silicon chip area.

SUMMARY OF THE INVENTION

One aspect of the present invention comprises an imager adaptable for recording a still image, the imager having the ability to translate the still image into an interlaced television format. The imager comprises an image array having a plurality of cells with the cells divided into a plurality of fields including at least a first field and a second field. A memory array is provided that comprises a plurality of memory cells including first cells for storing signals from the first imager array field, and second cells for storing signals from the second imager array field. A transferor simultaneously transfers the first field signals to the first memory cells and transfers the second field signals to the second memory cells. A readout circuit is provided that reads out the stored first and second field signals. A principal advantage of the invention is provided by the simultaneous transfer of fields "A" and "B" from the imager array to the memory array. In this manner, inconsistencies in the resultant image resulting from motion in the picture or changes in light conditions can be avoided, as fields "A" and "B" are accumulated and stored simultaneously rather than sequentially.

In another aspect of the invention, the above imager array comprises a frame transfer array having a plurality of rows and columns and the transferor comprises a multiplexer. The multiplexer is preferably an n×2 multiplexer, with n=2 for black and white applications, and n=3 for color applications.

The multiplexer preferably shifts out the signals stored in the entire image array into the memory array one row at a time. The first row belongs to field "A". The first n charges in the first row are put into a first column of the memory array. The next n charges or charge packets in the first row are put into a third column in the array, and so on, until the odd columns of the memory array are filled to a depth of n deep and have stored all of the signals from the first row of the image array. The odd columns of the memory array are separated by even columns of the memory array, which accept image cell signals from the second row of the imager array. The first n charges of the second row of the imager array are put into the second column in the memory array; the second n charges in the second row of the image array are put into the fourth column in the memory array, and so on. Subsequently, the first columnar sections of n charges in each column of the memory array are shifted downward to make room for the next columnar sections of n charges, which in turn store information from the third and fourth rows of the imager array.

In this manner, the information is transferred out of the image array into the memory array, with the final organization of the memory array being odd columns of columnar sections of n charges for field "A" and even columns of columnar sections of n charges for field "B". Field "A" is then read out from the memory in pairs or n-tuplets of charges, and then field "B" is next read out from the memory in pairs or n-tuplets of charges.

The use of the above frame transfer embodiment confers an advantage in that it retains high resolution, has high light sensitivity, and does not sacrifice the device chip area. The above architecture of the invention allows the use of an electronic shutter within a standard physical frame transfer area. Another advantage is that one bank of CCD serial registers and amplifiers is employed rather than the more usual two. Yet another advantage is that fields "A" and "B" are read out through the same amplifiers without any pattern noise due to process variations in fabrication of these amplifiers. A further advantage is that the smear usually associated with frame transfer devices is minimized by the use of a multiplexer that does not hamper a fast frame transfer.

In another aspect of the invention, the imager array comprises a frame interline transfer device. In this imager array, the image cells are formed in columns having adjacent vertical registers. Adjacent one end of the vertical registers is a memory array having alternating "A" columns and "B" columns, unlike in conventional devices where lines 1, 3, and 5 of the field "A" are first transferred into the vertical register and to the memory, or are read out. All the horizontal lines of the imager array of the invention have their charges transfer into the vertical registers, which then transfer the charge information into the "A" columns and then into the "B" columns of the memory array via a transferor as described above. The frame interline transfer device therefore does not have to take the still picture in two close intervals displaced in time by the delay needed to traverse the vertical registers. Further advantages occurring to this embodiment are that no smear occurs, as the vertical registers are shielded from light.

An advantage is provided by a preferred multiplexer for use with either the frame transfer or frame interline transfer embodiments of the invention. The multiplexer is formed adjacent the imager array, and is divided into a plurality of columns equal to the number of columns in the imager array. Like the imager array, each column in the multiplexer is comprised of alternating clock wells and virtual wells. The multiplexer is further comprised of a plurality of column groups, each group comprising n columns. A first column of the n columns in each group has clocked and virtual wells which are approximately of a normal dimension parallel to the columns. A second column of the group of columns has a well dimension that is substantially greater than the well dimension of the cells in the first column. Therefore, for each successive clock, a charge that is input into the second column will be physically moved further in the columnar direction than a charge that starts at the same time in the first column. At the opposite end of the multiplexer, a plurality of stepping wells are provided to transfer all of the signal charges into the second column. The last well at the end of the second column is operable to transfer each charge packet either into an "A" column or a "B" column of the memory array, depending on which has been activated.

A further advantage of the invention is provided by a "fish bone" topography of the memory array, wherein only one via is necessary to be made between a polysilicon gate level and a first metal level for each pair of memory cells.

BRIEF DESCRIPTION OF THE DRAWINGS

Other aspects of the invention and their advantages will be understood by referring to the detailed description, taken in conjunction with the appended drawings in which.

DETAILED DESCRIPTION

Figure 1:
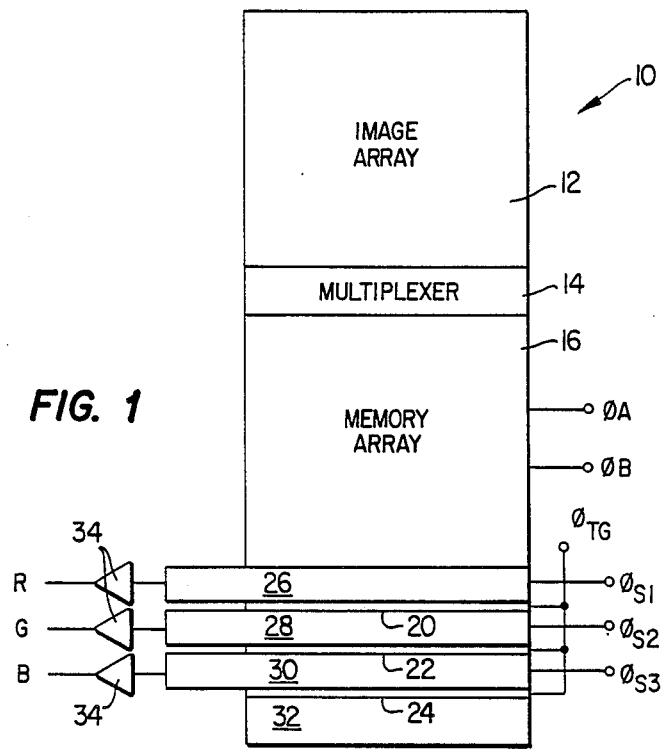
FIG. 1 is a schematic block diagram of an imager according to the invention.

Referring first to FIG. 1, a simplified schematic plan diagram of an imager according to the invention is indicated generally at 10. Imager 10 comprises an image array 12 which in the illustrated embodiment is of the frame transfer type; a multiplexer 14 formed adjacent one side of image array 12 for ordering the charges received from image array 12 in a specified order as will be later explained; and a memory array 16 that is formed adjacent a side of multiplexer 14 opposite image array 12. The accumulated charges from image array 12 are stored in memory array 16 in an order proper for interlaced readout.

A plurality of transfer gate regions 20–24 are connected to a transfer gate pulse source $\phi_{TG}$. The cells of a first serial register 26 are coupled in parallel to end cells of memory array 16, as will be explained in more detail in conjunction with FIG. 3. A first transfer gate region 20 selectively couples serial register 26 to a second serial register 28. A third serial register 30 is selectively coupled to serial register 28 via a second transfer gate region 22. Finally, a third transfer gate region 24 is operable to couple serial register 30 to a drain region 32.

The illustrated embodiment is suitable for color image sensors with tri-color periodicity, such as RGB. In the shown embodiment, an output of each of serial registers 26, 28 and 30 is input into a respective charge amplifier 34, where the signal is buffered and output.

Figure 2:
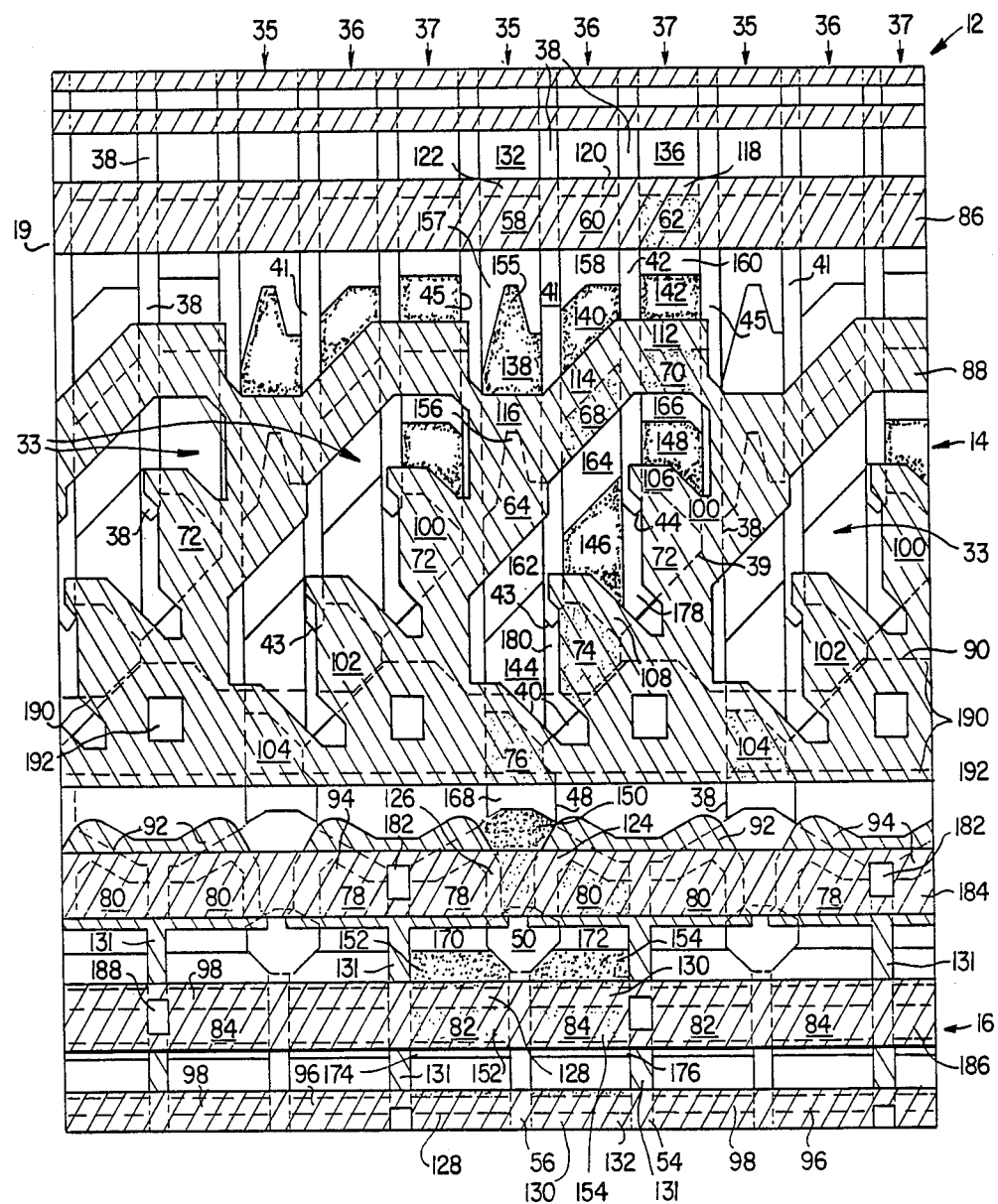
FIG. 2 is an enlarged schematic plan view of a CCD imager according to the invention, showing portions of an image array, a multiplexer and a memory array.

Referring now to FIG. 2, a detailed plan schematic view of a magnified portion of image array 12, multiplexer 14 and memory array 16 is shown. The imager is formed at a face of a semiconductor substrate or layer indicated generally at 19. In semiconductor substrate 19, particular doped regions are shown by a stippled shading, with respective wells and barrier boundaries shown by dotted lines. Polysilicon gate layers are shown by shading that is diagonal downward to the right. Selected first metal conductors are in general shown by shading that is diagonal upward. An insulating layer such as oxide (not shown) separates the polysilicon gate conductors from the semiconductor substrate, and a further insulating layer such as an oxide layer (not shown) separates the shown first metal layers from the polysilicon gate conductors except at the vias described below. The oxide layers have been omitted from the drawing for purposes of clarity.

At the top of FIG. 2, a portion of image array 12 is shown. This portion is disposed above and adjacent to a portion of multiplexer 14, which in turn is disposed above and adjacent to a portion of memory array 16.

A plurality of columnar CCD channels 35–37 are formed by a buried channel implant, the boundaries of which are shown by dashed lines 38. CCD channels 35–37 are defined and separated from each other by relatively undoped regions defined by the channel implant mask. Channels 35–37 are in the illustrated embodiment organized into groups of three, each group of three channels 35–37 comprising a multiplexer channel section 33. Each channel 35–37 is comprised of a plurality of CCD cells as will be hereinafter described.

The cell boundaries for each channel are different within any multiplexer section in multiplexer 14. Channel 35 is formed to be longer than channels 36 and 37, and channel 36 is formed to be longer than channel 37. Channel 37 is cut off at its bottom end by a diagonal boundary 39 of the buried channel implant, and channel 35 is likewise cut off by a diagonal boundary 40. Charge from the channel 37 merges at this preferred boundary into channel 36, and likewise charge from channel 36 merges into channel 35, as will be more fully described below.

In order to define channels 35–37 in each three-column channel section 33, the channel implant is masked to exclude a pair of vertical, elongate regions 41 and 42 that extend downwardly from image array 12 toward memory array 16 until they end at points 43 and 44. A further elongate masked area 45 is formed spaced to the right of elongate masked area 42, and extends downwardly until it joins with sloped boundary 39. A large, roughly triangular masked region 46 is integral with masked region 45, and is bounded by diagonal boundaries 39 and 40. A vertical channel implant boundary 48 continues downward from diagonal boundary 40 in order to further limit the channel region at this point to column 35.

At the beginning of memory array 16, further masked, non-channel-implanted areas 50 are formed, each masked area 50 located at the bottom terminal of a respective channel 35. Masked area 46 has bottom sloped boundaries 52 within memory array 16. The masked channel portions in memory array 16 continue downwardly only as thin columns 54 and 56 to horizontally separate adjacent memory cells (described below).

After the masked channel implant has been performed, a clocked well implant is performed in order to define a plurality of clocked wells 58–84 in image array 12, multiplexer 14 and memory array 16. Of these clocked wells, wells 58–62 are image array clocked wells, wells 64–67 are multiplexer wells, and wells 78–84 are memory array clocked wells.

After the clocked well implantation step, an oxide layer (not shown) is grown. Then, a plurality of polysilicon gate areas 86–98 are deposited, patterned and etched. At the top, a polysilicon gate area 86 takes the form of a simple horizontal band across the last clocked wells 58–62 of the image array 14. The polysilicon gate areas 88 and 90 of each multiplexer section 33 are irregular in shape. In each section 33 of multiplexer 14, a first gate area 88 starts from the right side of the section 33 as a regular rectangular polysilicon gate area, but then slopes downwardly over columns 36 and 35. Each first gate area 88 is continuous with a second gate area 90 in the column section 33 to the left of it. A polysilicon gate area 90 is disposed to be spaced below polysilicon gate area 88 in each column section 33. Gate area 90 forms a plurality of beaks or protuberances 100–104 that each overlie a respective clocked well. Thus, a protuberance 100 overlies a clocked well 72, a protuberance 102 overlies a clocked well 74, and each protuberance 104 overlies a clocked well 76. The protuberances 100–104 also serve to define a plurality of clocked barriers 106–110, each immediately above and to the right of respective clocked wells 72–76. The clocked and virtual barriers hereindescribed are formed by being masked during the clocked and virtual well implantation process steps. The virtual wells and barriers will be described in more detail below.

In a like manner, first polysilicon gate area 88 insulatively overlies (from right to left) clocked wells 70, 68 and 64, and defines clocked barriers 112, 114 and 116 that are each disposed immediately above respective wells 70, 68 and 64. Polysilicon image array gate area 86 likewise overlies (from right to left) respective clocked wells 62, 60 and 58, and further defines respective clocked barriers 118, 120 and 122.

At the beginning of memory array 16, a first horizontal line of polysilicon gate areas 92 and 94 insulatively overlie respective clocked wells 78 and 80. Clocked wells 78 are arranged in back-to-back pairs, as are clocked wells 80. A single, bilaterally symmetrical polysilicon gate area 92 overlies each adjacent pair of clocked wells 80, and a similarly formed integral gate area 94 overlies each adjacent pair of clocked wells 78. Polysilicon gate areas 92 and 94 serve to define respective clocked barriers 124 and 126 that are each formed at a sloping side of a respective clocked well 78 or 80.

Clocked wells 78 and 80 are formed in an irregular shape in order to channel the transfer of charge between them, and therefore, polysilicon gate areas 92 and 94 are formed in a similar irregular manner. With the exception of the last gated areas to be described in conjunction with FIG. 3, the remaining gate conductors 96 and 98 of memory array 16 are rectangular in shape. The second and subsequent rows of memory array 16 have a plurality of gate conductors 96 and 98 alternatively disposed across them. Each gate conductor 96 overlies a mirror-like image pair of clocked wells 82 and clocked barriers 128. Similarly, each gate conductor 98 overlies a mirror-like image pair of clocked wells 84 and clocked barriers 130. The plurality of conductive strips 131 are formed out of polysilicon and are insulatively disposed between columns of memory array 16 so as to connect a gate conductor 92 and gate conductors 98 together at their centers, and to connect a gate conductor 94 and gate conductors 96 at their centers. In this way, for each adjacent pair of columns in memory array 16, a gate conductor 94 and all gate conductors 96 will be electrically connected in common, and a gate conductor 92 and all gate conductors 98 will be electrically connected in common.

After the polysilicon gate areas have been patterned and etched, a virtual well implantation step is performed to form a plurality of virtual wells 132–154. The polysilicon gate areas act to self-register many of the boundaries of the virtual wells 132–154, with the remaining boundaries thereof being defined by an appropriate photoresist mask. Each area of columns 35–37 in between an implanted virtual well and a polysilicon gate area above it is defined as a virtual barrier. The virtual barriers are indicated by numerals 157–176. The last virtual wells 132–136 of image array 12 are rectangular in shape. The first set of virtual wells 138–142 in each multiplexer section 33 slant downward and get progressively longer from right to left. This is repeated in a second set of virtual wells 144–148. There is a further, last virtual well 150 at the end of each column 35.

Within memory array 16, a plurality of virtual wells 152 and 154 are formed in order to define the virtual half of each CCD memory cell therein. Virtual barriers 170, 172, 174 and 176 are defined by photoresist-masked areas and the lower edges of integral conductors 92 and 94.

As one proceeds leftward from column 37 to column 35 in any one multiplexer section 33, the virtual wells, virtual barriers, clocked wells and clocked barriers in the columns all get progressively longer. Thus, virtual well 140 has a lower end that is substantially below the lowest point of virtual well 142, and clocked well 68 has a lowest point which is much below clocked well 70. In column 35, virtual well 138 is almost twice as long as virtual well 142 in column 37. A tongue-shaped formation 155 of virtual well 138 assists the transfer of charge across virtual barrier 157 from clocked well 58. In a like manner, a tongue 156 of clocked well 64 is formed to assist the transfer of charge over clocked barrier 116 from virtual well 138.

In the top portion of multiplexer 14 each clocked or virtual well is adjacent only to an upper barrier and a lower barrier, and thus charge is permitted to flow only in a longitudinal direction. However, the virtual wells 144–146 toward the bottom of multiplexer 14 each are adjacent two barriers over which a pixel of charge can enter, and one further barrier over which a pixel of charge can exit. In column 37, a virtual well 148 is operable to transfer charge across clocked barrier 106 into a terminal clocked well 72, and terminal clocked well 72 is operable to transfer charge over a longitudinal virtual barrier 178 into virtual junction well 146. Virtual junction well 146 is thus able to receive charge either from terminal clocked well 172 or clocked well 68. In a like manner, terminal clocked well 74 is operable to transfer charge over a longitudinal virtual barrier 180 into a virtual junction well 144. Therefore, virtual junction well 144 is able to receive a pixel or packet of charge either from clocked well 64 or clocked well 74. From virtual junction well 144, charges are transferred over clocked barrier 110 into clocked well 76, and then over virtual barrier 168 into terminal virtual well 150. Depending on which potential barrier has been lowered by the application of a phase clock voltage, virtual well 150 is operable to transfer the charge stored therein over either clocked barrier 126 into clocked well 78, or over clocked barrier 124 into clocked well 80. After a charge has been transferred either to clocked well 78 or clocked well 80, the transfer of the signal charge from there onward into successive rows of memory array 16 proceeds in a normal CCD memory array fashion.

The multiplexer 14 provides a method of repositioning charges in a charge group originally stored in a horizontal relationship to each other in a row, such that the charges in the group may be transferred serially from terminal virtual well 150 into a phase-clock-selected column or channel of memory array 16. The charge group will start off in last virtual image array wells 132–136, whence they were transferred from one of the image array rows above. On the next image array clock pulse, the charges in the charge group will be transferred to clocked wells 58–62. They are next transferred to virtual wells 138–142, and thence to clocked wells 64–70, which are clocked by a multiplexer clock source independent of the image array frame transfer clock.

In the next longitudinal transfer, the charges are transferred to respective virtual wells 144–148. Then, these charges are transferred below to clocked wells 72–76. Upon the next clock, the charge stored in clocked well 72 is transferred to virtual junction well 146. Simultaneously with this, the charge then stored in clocked well 74 is transferred to virtual well 144. Also simultaneously on this clock, the charge stored in clocked well 76 is transferred to terminal virtual well 150. Therefore, while the charge in column 35 has been shifted downward, the charge in column 36 has been shifted over to column 35, and the charge in column 37 has been shifted over to column 36. This process repeats until all charges in the charge group have been fed into a selected column or channel in memory array 16. Then the next charge group, which has been transferred to last image array wells 58–62, is multiplexed through multiplexer 14 and demultiplexed into a new column of memory array 16 that had not been previously selected. For example, if the first charge group appearing in last wells 58–62 had been multiplexed through well 150 and demultiplexed into the memory channel starting with clocked well 78, then the next charge group will be demultiplexed into clocked well 80 on the other side of well 150. In this way, for each column section of image array coupled to a respective multiplexer section 33, odd rows of charges will be transferred into an odd column or channel of memory array 16, and even rows of charges will be transferred to an even column or channel in memory array 16. This frame transfer process occurs simultaneously through all multiplexer sections 33.

If odd and even rows of the image array 12 both had repeating units of tricolor information (R, G, B, R, G, B . . . ) then RGB pixel groups will be stacked vertically in respective odd and even channels of memory array 16, with the red pixel of each pixel group being lowest. Pixel groups from the first odd and even rows of the memory array will occupy the first three lowest rows of memory array 16, the pixel groups from the next odd and even rows of the image array 12 will be transferred into the fourth through sixth lowest rows in the memory array 16, and so on.

The polysilicon gate areas 86–96 are connected by vias to first metal clock conductors. In the first row of the memory array 16, gate conductors 94 are connected by contacts 182 to an "A" first level metal conductor 184. In the next row, polysilicon gates 98 are connected to a $\phi_B$ clock conductor 186 through vias 188. Gate conductors 92 and 96 are not directly connected, but are indirectly connected through conductive strips 131 to vias 182.

In memory array 16, the cells are arranged in a "fish bone" pattern, whereby adjacent integral tabs of gate conductor areas 96 and 98 are activated on the same clock. In this manner, only one-half of the vias are required in relation to conventional clocking structures, providing an additional technical advantage.

A first level method multiplexer clock conductor is shown at 190. Block conductor 190 is positioned over poly gate area 90, but is shown in phantom for clarity. Conductor 190 is electrically connected to poly gate areas 88 and 90 through a plurality of vias 192.

Figure 3:
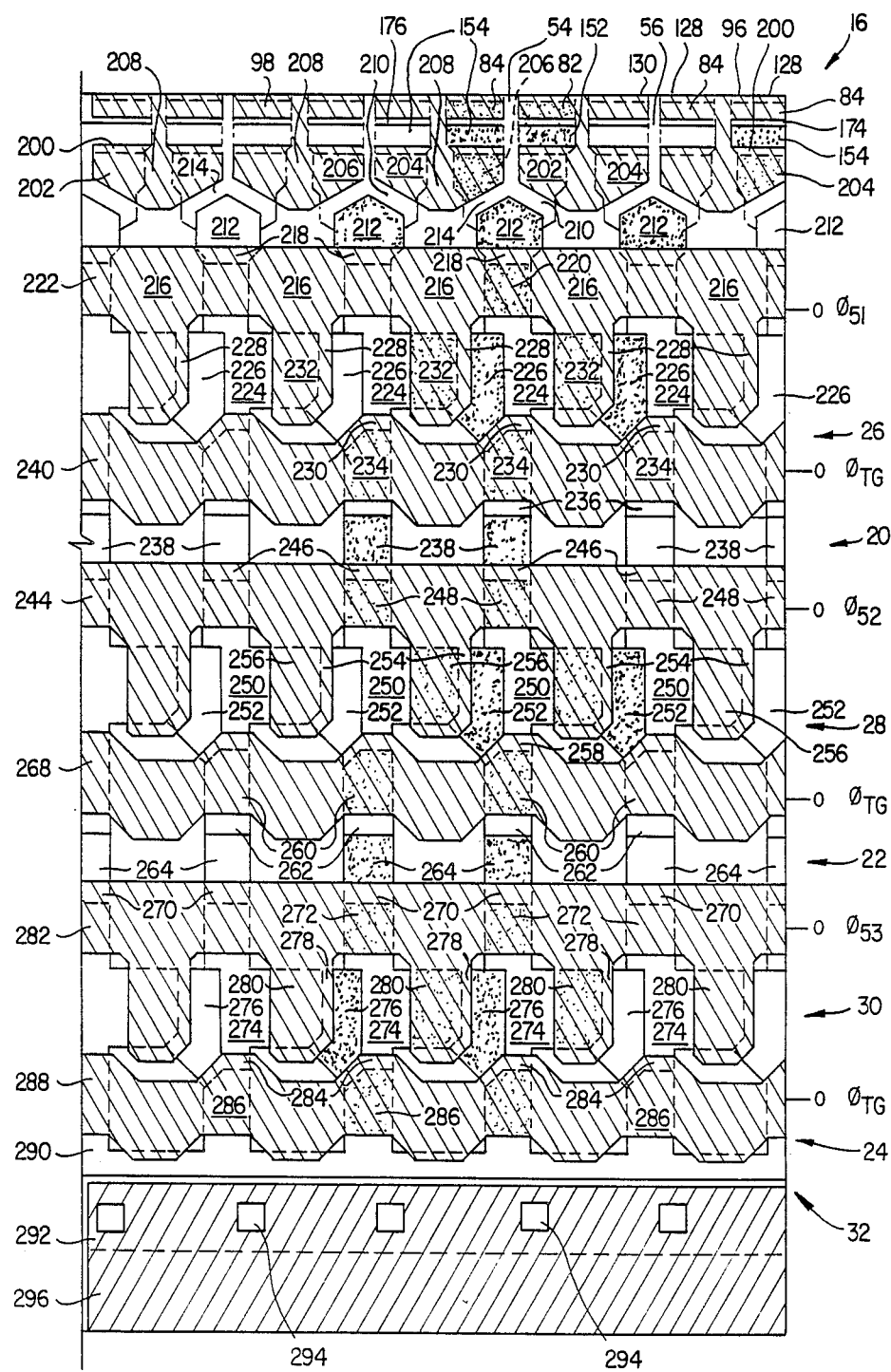
FIG. 3 is an enlarged schematic plan view of a portion of a plurality of CCD serial registers according to the invention.

Turning now to FIG. 3, a schematic magnified plan view of a terminal portion of memory array 16, portions of transfer gates 20–24, portions of serial registers 26–30, and a portion of drain 32 are shown. The structure shown in FIG. 3 is preferably simultaneously fabricated with the rest of imager 10. At the top of FIG. 3, the last regular horizontal row of clocked barriers 128 and 130 and clocked wells 82 and 84 are shown. Clocked well 82 is clocked by a clock $\phi_A$ while clocked well 84 is clocked by a clock $\phi_B$. A polysilicon gate 96 is insulatively disposed over clocked wells 82 and clocked barriers 128, while a similar polysilicon gate 98 is insulatively disposed over clocked wells 84 and clocked barriers 130.

In the next row down, a plurality of virtual barriers 174 and 176, and virtual wells 152 and 154, are defined by masked implants and the absence of a polysilicon gate as has been previously described for FIG. 2. Wells 82, 84, 152 and 154, and barriers 128, 130, 174 and 176, are vertically defined by the absence of a channel implant in columnar masked areas 54 and 56.

Below virtual wells 152 and 154 are a set of clocked barriers 200 and 202 that are formed in the same manner as clocked barriers 128 and 130. Below clocked barriers 200 and 202 are a plurality of paired, trapezoidally shaped clocked wells 204 and 206 that are the last clocked wells in the memory array. Clocked wells 204 are arranged in opposed pairs, as are clocked wells 206. Each clocked well pair 204 is divided by an expanded region 208 that was masked from receiving the channel implant. Each clocked well 204 is disposed alongside a respective clocked well 206 that operates off a different phase clock as described above. Each clocked well 204 is separated by a virtual barrier 210 from a respective first virtual well 212 of the transfer gate and serial register structure. Likewise, the opposed clocked well 206 is separated by a virtual barrier 214 from its respective virtual well 212. Thus, there exists one virtual well 212 for each pair of odd and even memory array columns or channels, the channels of each pair ending in clocked wells 204 and 206 respectively.

Below wells 212, the buried channel implant mask is widened to create non-implanted regions 216. Regions 216 act as barriers to the horizontal movement of pixels of charge, which pixels are therefore forced to be transferred vertically from virtual well 212 downward.

Each virtual well 212 is bounded on its lower side by a respective clocked barrier 218. Clocked barriers 218 are in turn each adjacent to a respective clocked well 220. Clocked barriers 218 and clocked wells 220 are clocked by a polysilicon conductor 222 that is insulatively disposed over these and certain serial register barriers and wells. Polysilicon conductor layer 222 is connected to serial register clock source $\phi_{S1}$ as is shown in FIG. 1. Each clocked well 220 is in turn bounded on its bottom side by a virtual barrier 224.

Virtual barrier 224 separates clocked well 220 from an L-shaped virtual well 226. Each virtual well 226 is disposed horizontally adjacent to a respective clocked barrier 228, and is disposed vertically adjacent to a respective clocked barrier 230. Each clocked horizontal barrier 228 is disposed horizontally adjacent a respective clocked well 232, which in turn is adjacent to a next virtual barrier 224. The serial register 26 is therefore comprised of horizontally connected repetitions of a unit comprising virtual barrier 224, virtual well 226, clocked barrier 228 and clocked well 232. Each barrier 228 and well 232 in serial register 26 are clocked by conductor 222, which projects downwardly in fingers in order to overlay these areas.

Each clocked barrier 230 is disposed immediately above a respective clocked well 234. Each clocked well 234 is in turn disposed immediately above a respective virtual barrier 236, which in turn is adjacent to and above a respective virtual well 238. Clocked barrier 230 and clocked well 234 are clocked by a transfer gate conductor 240 that is insulatively spaced over them. Conductor 240 is coupled to a transfer gate pulse source $\phi_{TG}$, as is shown in FIG. 1. A transfer gate unit comprising a clocked barrier 230, a clocked well 234, a virtual barrier 236 and a virtual well 238 is provided for each column in between the serial registers. Each transfer gate unit 230–238 is separated from a transfer gate unit of an adjacent column by a non-implanted area 242, which extends from the horizontal CCD wells and barriers 224–232 making up the first serial register 26 down to the CCD wells and barriers 224–232 making up the second serial register 28.

The structure described for serial register 26 and the first transfer gate 20 is repeated for serial register 28, transfer gate area 22, serial register 30 and transfer gate 24. Second serial register 28 has a conductor 244 that insulatively overlies a plurality of clocked barriers 246 and clocked wells 248 distributed horizontally thereunder. Clocked barriers 246 and wells 248 are provided to move pixels vertically from transfer gate region 20 to the horizontal component of serial register 28. This horizontal component is in turn comprised of a plurality of serially connected virtual barriers 250, virtual wells 252, clocked barriers 254 and clocked wells 256.

Below serial register 28 is a transfer gate area 22, which is comprised of a series of clocked barriers 258, clocked wells 260, virtual barriers 262, and virtual wells 264. Clocked barriers 258 and clocked wells 260 are clocked by a preferably polysilicon gate conductor 268 formed horizontally in parallel with the serial registers 28 and 30 and insulatively overlying each clocked barrier 258 and clocked well 260. Conductor 268 is coupled to transfer gate clock source $\phi_{TG}$.

Serial register 30 is formed in a manner similar to serial register 28. For vertical transfer from transfer gate area 22, a plurality of clocked barriers 270 and clocked wells 272 are disposed beneath respective virtual transfer gate wells 264. Clocked wells 272 are in turn disposed adjacent to a plurality of virtual barriers 274 of serial register 30. To transfer charge horizontally, repeating units of virtual barrier 274, a virtual well 276, a clocked barrier 278, and a clocked well 280 are connected together laterally.

Clocked barriers 270 and 278 and clocked wells 272 and 280 are simultaneously clocked by a preferably polysilicon gate conductor 282, which is formed generally horizontally and has vertical extensions to be insulatively spaced over the clocked wells 280 and the clocked barriers 278. Conductor 282 is coupled to a third serial register clock $\phi_{S3}$.

Each virtual well 276 is formed so as to be adjacent to a clocked barrier 284 immediately beneath it and slightly to the right. Each clocked barrier 284 is adjacent a respective clocked transfer gate well 286. A plurality of clocked barriers 284 and wells 286 are formed, one for each virtual well 276. Clocked barriers 284 and clocked wells 286 are disposed insulatively underneath a transfer gate conductor 288 that is connected to transfer gate pulse source $\phi_{TG}$.

Each transfer gate barrier 284 and well 286 within transfer gate area 24 operates to transfer charge into a general virtual region 290, which will in turn purge the charge to a lightly implanted drain 292. Drain 292 is connected via a plurality of contacts 294 to a drain conductor 296. Each horizontal polysilicon conductor 222, 240, 244, 268, 282 and 288 is connected through a plurality of contacts (not shown) to first metal horizontal conductors in order to decrease losses.

In operation, clock $\phi_A$ will act to transfer charges from clocked wells 204 in the odd memory channels to virtual wells 212. At a subsequent time, $\phi_B$ will act to transfer charges from clocked wells 206 in the even memory channels to virtual wells 212. Thus, a two-to-one multiplexing effect is obtained. Through the operation of $\phi_{S1}$, the charges in the virtual wells 212 are transferred down through barriers 218, clocked wells 220 and barriers 224 to virtual wells 226. From here, further transfer may be made in a leftward horizontal direction by further operation of clock $\phi_{S1}$, the charges then being transferred through clocked barriers 228, clocked wells 232, virtual barriers 224, and thence to the next virtual wells 228.

On the other hand, $\phi_{TG}$ may instead be operated, transferring the charge from each virtual well 226 through a respective clocked barrier 230 and clocked well 234 to an intermediate virtual well 238. The operation of clock $\phi_{S2}$ will then be capable of transferring charge from virtual wells 226 to virtual wells 252. In this way, charge can be shifted either downwardly or leftwardly, depending on the operation of the $\phi_{S1-3}$ and $\phi_{TG}$ clocks.

In operation, a charge group comprising three charges corresponding to red, green and blue information will be aligned vertically within the last three cells of each column in the memory array, starting, for example with a red charge of information being located in each clocked well 206, a green charge of information being located in the clocked well above it, and a blue charge of information being located in the clocked well above the one containing the green charge. The $\phi_A$ clock is then turned on to transfer each red charge of information in the charge groups currently being read out from the odd channels of memory array 16 into corresponding virtual wells 212. Through manipulation of the $\phi_{S1}$, $\phi_{S2}$, $\phi_{S3}$ and $\phi_{TG}$ clocks, the red, green and blue charges of information in the last three rows of the odd columns of memory array 16 will end up being located in clocked wells 232, 256 and 280.

After three memory array rows of information have thus been shifted into the serial register, they then may be horizontally clocked out by holding $\phi_{TG}$ high and pulsing $\phi_{S1}$, $\phi_{S2}$, and $\phi_{S3}$. The information will then be output from red, green and blue amplifiers 34. Note that, with respect to the horizontal pitch, each cell in the serial register equals two columns (odd+even) in the memory array. A technical advantage is presented in the ability to accept charge from either memory column, or both columns together. This provides a charge summing function as will be described below. A further technical advantage is presented in that no multiplexing gate is necessary between the memory and the serial registers, since the multiplexing is accomplished between the image array 12 and the memory array 16.

The above-described device has a further advantage in that its resolution is approximately twice that of the equivalent interline transfer device, as no interline channels are required. The above-described imager also provides yet another advantage in that simultaneous exposure is provided for Field A and B. It is however necessary to incorporate a fast shift into the memory array in order to avoid smear if no mechanical shutter is used.

The above structure provides a further advantage in that it can be employed in a video movie mode as well as in a still camera mode, the still camera mode being above described. Referring to FIG. 3, in the video movie mode clock $\phi_A$ and clock $\phi_B$ are switched on simultaneously, therefore transferring charge from both clocked well 204 and clocked well 206 into virtual well 212. Thus, the information from fields A and B is summed together. Thereafter, in order to achieve an interlaced readout, it is desirable to shift the signal in memory A one line down in the field A cycle. Suppose, for example, that memory A consists of horizontal lines 2, 4, 6 and 8, and is loaded into the A or odd columns. Memory B, which consists of lines 1, 3, 5 and 7, is loaded into the B or even columns. After shifting, field A comprises lines 2, 4, 6 and 8, while field B comprises lines 3, 5, 7 and 9. Line 1 is lost to the drain. After summing the read out lines, field A will consist of signals from lines 1 and 2, 3 and 4, and 5 and 6, while field B will consist of lines 2 and 3, 4 and 5, and 6 and 7.

Figure 4:
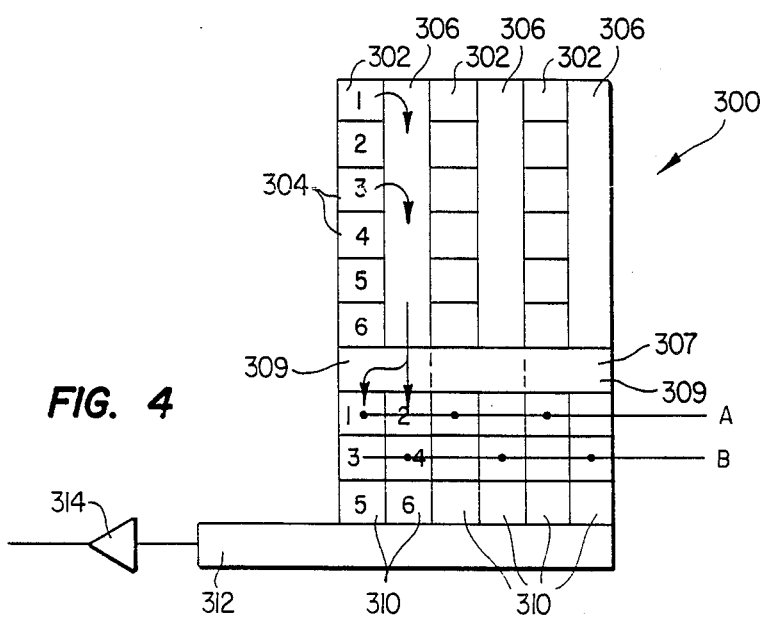
FIG. 4 is a simplified schematic block diagram of a frame interline transfer device embodiment of the invention.

The above description is principally for a frame transfer device embodiment of the invention working in a continuous TV sensing mode. Turning now to FIG. 4, a frame interline transfer device embodiment of the invention is shown and described schematically. Like the frame transfer device, the frame interline transfer device is preferably formed at a single face of a semiconductor substrate. An interline transfer image array is indicated generally at 300. The shown array has only three columns 302 of six imaging cells 304 apiece. The numbers of these components have been greatly reduced for purposes of illustration, it being understood that a more typical number of columns 302 and cells 304 number in the hundreds.

An image area channel 306 is disposed adjacent each image cell column 302. After sensing, charges are transferred into the CCD image channel 306 in parallel, and is then shifted downwardly.

A multiplexer 307 is coupled to the end of channels 306, and preferably comprises a plurality of multiplexer sections 309, one for each channel 306. A memory array 308 is disposed adjacent the multiplexer 307. Each multiplexer section 309 demultiplexes charge into a pair of memory channels 310.

Memory array 308 is organized into a series of rows and columns. Only three rows and six columns are shown here, it being understood that many more such rows and columns or channels are typically employed. As in memory array 16, memory array 308 is divided into a memory (A) and a memory (B), the elements of these memories being disposed in alternating odd or even columns 310. The first, third, fifth, etc. columns have gates that are selected by an "A" memory clock, and the even columns are selected by a "B" memory clock. The charges will flow from a channel 306 through a respective multiplexer section 309 into the memory column 310 that is selected by one or the other of the clocks. The other column coupled to section 309 is at that point not accepting any charge. The memory A clock and the memory B clock alternate, such that charges flowing from imager channel 306 through a multiplexer section 309 alternately go into the "A" column and the "B" column. The final stored order of charges 1–6 is shown, where charges 1–6 were originally arrayed consecutively in one column 302. All multiplexer sections 309 preferably operate simultaneously to fill all memory columns 310.

After the charges are stored in the indicated order within memory array 308, readout can take place in a manner similar to that described for the frame transfer device using at least one serial register 312 and a corresponding output amplifier 314.

A further advantage of a frame interline transfer system is that, for still-image use, a "snap shot" can be taken for all of the image pixels at the same time, thus eliminating any variations in scene between two snap shot times. Also, the frame interline transfer structure removes any opportunity for smear.

In a further, non-illustrated embodiment, the frame transfer embodiment shown in FIGS. 1, 2 and 3 can be modified for use in black and white applications. Referring to FIG. 2, instead of groups of three columns 35-37, there would be multiplexer sections of two columns that would funnel charge groups of two into a single memory channel in memory array 16. In FIG. 3, the memory channel would still be clocked by alternate clocks "A" and "B". There would, however, be only two serial registers instead of three, and therefore one transfer gate and one serial register would be omitted.

In sum, a novel image sensing architecture has been shown and described that is suitable for taking still images. Two fields of the image are exposed at the same time, and are then stored in an order that effects a proper NTSC interlace readout. The image array of the invention has twice the resolution of other still-camera devices with little or no smear. Further, the invention may be operated in a video movie mode simply by summing stored fields A and B.

While preferred embodiments of the invention and their advantages have been described in the above detailed description, the invention is not limited thereto, but only by the scope and spirit of the appended claims.

What is claimed is:

1. An imager formed at a face of a semiconductor substrate for recording a still image and for translating the still image into a selected television format, comprising:
   a frame transfer image array having a plurality of image cells, said image cells accumulating charge in response to input light and arranged in a plurality of rows and columns, odd numbered ones of said rows constituting a first field and even numbered ones of said rows constituting a second field;
   a memory array having a first plurality of memory cells including first cells arranged in first memory columns for storing first field signals contained in said first field and second cells arranged in second memory columns for storing second field signals contained in said second field;
   a multiplexer coupled between the image array and the memory array for enabling transfer of groups of n charges in said first field signals to said first memory cells and like groups of n charges in said second field signals to said second memory cells; wherein n is greater than 2 and
   a readout circuit for reading out said first and said second field signals from said first and second memory cells.

2. The imager of claim 1, wherein said multiplexer comprises a plurality of column sections each coupled to a corresponding image array column section, said multiplexer column sections each comprising a plurality of columns equal to said plurality of columns in each said image array column section;
   a first column of each said multiplexer column section receiving a signal from a first column in a corresponding image array column section, a second column of said multiplexer column section receiving a signal from a second column of said corresponding image array column section;
   said multiplexer disposed between said image array and said memory array, gate means in said multiplexer for advancing the signal in said first multiplexer column toward said memory array ahead of the signal in said second multiplexer column;
   a gate for transferring the signal in said second multiplexer column to a location in said first multiplexer column behind said first signal with respect to said memory array; and
   a gate disposed at an end of each said first multiplexer column for sequentially transferring said signals to a selected memory column.

3. The memory array of claim 2, wherein said columns in each multiplexer column section each comprise a plurality of serially connected CCD cells for transferring charges from said image array columns through said CCD cells to said selected memory column;
   each CCD cell in said multiplexer having at least one well formed in said semiconductor substrate, at least one selected well of each said first multiplexer column having a greater length in the direction of said memory array than a corresponding well in said second multiplexer column, such that said selected well is displaced toward said memory array relative to said corresponding well.

4. The imager of claim 2, wherein said first and second columns of said multiplexer column section each comprise a plurality of CCD cells, each CCD cell having at least one well and one barrier formed in said semiconductor substrate, a junction well in said first multiplexer column disposed adjacent a first barrier, said first barrier disposed adjacent a well of an upstream CCD cell in said first multiplexer column, a second barrier disposed adjacent said junction well, said second barrier disposed adjacent a selected well in said second multiplexer column, said selected well in said second column operable to transfer signals to said junction well to thereby transfer signals from said second multiplexer column to said first multiplexer column.

5. The imager array of claim 4, wherein each said multiplexer column section comprises said first and second multiplexer columns and a third multiplexer column, said third column comprising a plurality of CCD cells each having at least one well, the CCD cells in each multiplexer column disposed in a line between said image array and said memory array, each multiplexer column operable to receive a signal from a respective last CCD cell in said image array;
   said wells in said second multiplexer column including a junction well, a last well in said third multiplexer column disposed farthest from said image array of the wells in said third multiplexer column, said last well disposed adjacent a vertical barrier separating said last well in said third column from said junction well in said second column;
   a last well of said wells in said second column disposed farthest from said image array of the wells in said second multiplexer column, said last well in said second column disposed adjacent a vertical barrier, said vertical barrier disposed adjacent said junction well in said first column, such that each said multiplexer column section is operable to transfer signals from each column in row of a respective image array column section into a selected column of a respective column section in said memory array.

6. The imager of claim 4, wherein each said CCD cell inside said multiplexer is a virtual phase CCD cell having a clocked well and a virtual well, said last well of said third multiplexer column and said last well of said second multiplexer column each comprising a clocked well, said junction well of said second multiplexer column and said junction well of said first multiplexer column each comprising a virtual well.

7. The imager of claim 1, wherein said memory array comprises a plurality of memory column sections each having a first and a second memory column, said first memory columns operable to store signals from said fist field, said second memory columns operable to store signals from said second field;

said readout means operable to select either said first memory columns or said second memory columns for reading out said signals from either said first field or said second field.

8. The imager of claim 7, wherein said transferor comprises a multiplexer having a plurality of multiplexer sections, said image array divided into image column sections each having a plurality of image columns each multiplexer section coupled to each image column in a respective image column section for receiving said first and second field signals;

a memory column section provided for each multiplexer column section, each said multiplexer column section having an output well for transferring said first and second field signals to either the first or the second memory column of a respective memory array column section.

9. The imager of claim 8, wherein said first and second memory columns each comprise a plurality of CCD wells formed at a face of a semiconductor substrate, each first memory column includes a first clocked well, said first clocked well disposed adjacent a first barrier, said first barrier disposed adjacent an output well of a respective multiplexer section; each second memory column including a second clocked well, said second clocked well disposed adjacent a second barrier, said second barrier disposed adjacent said output well of said respective multiplexer section; said first clocked well and said second clocked well clocked by alternating phase clocks such that a signal stored in said output well is operable to be transferred into either said first clocked well or said second clocked well.

10. The imager of claim 1, wherein said image array comprises an interline transfer image array, said interline transfer image array comprising a plurality of sensor cells arranged in columns, each column of sensor cells formed adjacent a channel formed in parallel to said column, said first and second cells of said memory array disposed in respective first and second memory columns, an output of each said image array channel selectively coupled by said multiplexer to at least two columns of said memory array;

signals accumulated in each column of said sensor cells operable to be transferred into a respective channel, said channel operable to transfer signals serially down said channel to said multiplexer, said transferor operable to transfer each said signal from said channel to a selected column in said memory array.

11. The imager of claim 10, wherein said multiplexer comprises:

an input for each pair of columns in said memory array, an output for each image array channel, a first input of a first memory column and a second input of a second memory column coupled to said output of a respective image array channel, said first input clocked by a first clock source, said second input clocked by a second clock source alternating with said first clock source, signals in said channel operable to be transferred into a selected one of said first and second memory column inputs responsive to an active state of a corresponding clock source.

12. The imager of claim 1, wherein said first cells of said memory array are disposed in first channels at a face of a semiconductor layer, said second cells of said memory array disposed in second channels in said face and insulatively disposed in parallel to said first channels;

first channels are disposed in first channel pairs insulatively adjacent each other, second channels are insulatively disposed adjacent each other in second channel pairs, said first and second channel pairs alternating across said memory array, each cell in each channel paired with a cell in a paired channel in a direction orthogonal to said channels.

13. The imager of claim 12, wherein said first and second memory cells comprise virtual phase CCD cells, each said virtual phase CCD cell having a clocked well and a virtual well, each clocked well of a first cell in one channel paired with a clocked well of a first cell in a paired channel, each clocked well of a second cell in one channel paired with a clock well of a second cell in a paired channel;

said paired clocked wells of said first cells having a single integral first gate conductor insulatively disposed thereover, said paired clocked wells of said second cells having a single integral second gate conductor insulatively disposed thereover, first conductive means for coupling each first gate conductor to a first clock source, second conductive means for coupling each second gate conductor to a second clock source, such that the transmission of signals into and through said first and second wells may be controlled independently of each other.

14. The imager of claim 13, wherein said first conductive means comprises a plurality of conductive links insulatively disposed above said first channel pairs to join together all first gate conductors disposed over each first channel pair, selected ones of first gate conductors connected to a first phase clock conductor;

said second conductor means comprising a plurality of conductive links insulatively disposed above said second channel pairs, selected ones of said second gate conductors connected to a second phase clock conductor.

15. The imager of claim 14, wherein said clocked wells of said CCD memory cells are disposed in rows orthogonal to said channels in said memory array;

odd rows of said clocked well rows each having a first phase clock conductor insulatively disposed thereover, even rows of said clocked well rows each having a second phase clock conductor insulatively disposed thereover, an even row spaced between each proximate pair of odd rows;

a conductive contact made within between each first phase clock conductor and each first gate conductor in a respective odd row, a conductive contact made between each second phase clock conductor and each second gate conductor in a respective even row.

16. Apparatus for sensing, storing and transmitting a still image formed at a face of a semiconductor substrate, comprising:
- a frame transfer image array having a plurality of image cells formed at said face and arranged in parallel rows and channels orthogonal to said rows, each image cell operable to accumulate a charge responsive to incident light;
- said frame transfer image array divided into a plurality of channel sections, each channel section having a plurality of channels, the image cells in each channel coupled in series;
- each channel terminating in a terminal cell, a multiplexer formed at said face and disposed adjacent said terminal cells, said multiplexer having a receiver for receiving charges from each terminal cell in said respective channel section in parallel and a transmitter for transmitting said charges in series;
- a memory array having a plurality of memory cells arranged in rows and in a plurality of channels orthogonal to said rows, said channels forming channel pairs, each pair having a first channel and a second channel, input cells of said first and second channels in each channel pair coupled to the transmitter of a respective multiplexer section;
- each said transmitter operable to transfer charges from said output cell serially to either a first or a second memory channel input cell in a respective memory channel pair; and
- a serial register for reading out charges from either said first channel in parallel or said second channel in parallel into a register section, said register section operable to be serially read out.

17. The apparatus of claim 16, wherein said serial register further contains a plurality of register cells disposed in said face, each memory channel pair having first and second end cells disposed remotely from channel input cells, a plurality of gates of said serial register each disposed adjacent a respective first and a respective second end cell for transmitting a charge from either a first end cell or a second end cell into a register cell.

18. The apparatus of claim 17, and further comprising:
- a plurality of serial registers, a first serial register coupled to said end cells in said memory array by said gates, a plurality of first transfer gates selectively coupling respective cells of said first serial register to respective cells of a second serial register, a plurality of second transfer gates selectively coupling respective cells of said second serial register with respective cells of a third serial register, a plurality of third transfer gates selectively coupling respective cells of said third serial register with a drain region;
- said serial registers each operable to transmit charges encoding information for a respective one of three colors as sensed by said image array, said transfer gates operable to selectively transfer charges to the correct serial register and to selectively dump said charges to said drain.

19. The apparatus of claim 16, wherein odd rows of said frame transfer image array comprise a first field of image pixels, even rows of said frame transfer image array comprising a second field of image pixels;
- charges from said odd rows operable to be transferred by said multiplexer to said first channels of said memory array, charges from even rows of said frame transfer image array operable to be transferred by said multiplexer to said second channels of said memory array;
- said serial register operable to read out charges from said first channels and then to read out charges from said second channels.

20. The apparatus of claim 16, wherein said multiplexer comprises a plurality of multiplexer sections each having a plurality of input cells, each input cell coupled to a terminal cell of a respective channel section, said input cells operable to receive respective charges from said terminal cells in parallel, an output cell of each multiplexer section operable to serially transmit charges received by said input cells.

21. A method for and transferring a visual image, comprising:
- sensing an image with an image sensor array having a plurality of image cells, said cells comprising a first field of cells and a second field of cells;
- transferring the first field of cells to odd columns of memory cells in a single memory array;
- accumulating a first field of charges responsive to light incident on odd rows of the cells in the image array; accumulating a second field of charges responsive to light incident on even rows of the cells in the image array;
- transferring the second field of cells to second even columns of memory cells in the single memory array; and
- reading out the charge accumulated in the memory cells in the single memory array.

22. The method of claim 21 and further including the steps of:
- storing charges of any predetermined charge group from cells in the image array that were laterally vertically adjacent each other, so as to be laterally adjacent to each other in the memory array;
- merging the charge in each cell in each odd column with the charge stored in a laterally adjacent cell in the adjacent even column in said memory array; and
- reading out the merged odd and even charges in a video movie mode.

23. The method of claim 21 wherein said step of transferring charges from the rows of the image array to said memory array includes the steps of:
- dividing the image array into a plurality of channel sections each comprising a like plurality of image array channels;
- transferring the charges accumulated in the image array into a multiplexer one row at a time, the step of transferring including the substeps of:
  - transferring a charge group in a channel section into a corresponding multiplexer section, each charge group comprising a plurality of charges orignating from a single row within a channel section;
  - in each multiplexer section, arranging the charges of the charge group in a serial order;
  - for each multiplexer section, serially outputting the arranged charge group from a single multiplexer section output;
  - for each multiplexer section, transferring the charge group to either a respective first column in the memory array or a respective second column in the memory array, depending on whether the charge group comes from an odd image array row or an even image array row;

performing said steps of transferring to the multiplexer section, arranging the charge groups in serial fashion and transferring the charge groups to the memory array until all of the charges in the image array have been transferred to the memory array;

serially reading out the charges in the odd columns of the memory array; and serially reading out the charges in the even columns of the memory array.

24. The method of claim 23, wherein each charge group comprises three charges respectively accumulated responsive to a different color of light, the method comprising the further steps of:

for each pair of first and second columns in the memory array:

repeating said steps of transfering arranging, outputting and transferring within the memory array until all charges from the image array have been stored, the first and second rows charge groups to be stored then occupying the last three cells in each column of the memory array;

clocking a charge pixel of a charge group stored in the first column of the memory array into a cell of a first serial register;

simultaneously clocking the first charge through a first transfer gate into a cell of a second serial register and clocking a second charge of the charge group into the cell of the first said serial register;

simultaneously clocking the first charge through a second transfer gate into a cell of a third register, the second charge through the first transfer gate into the cell of the second register, and the third charge of the charge group into the cell of the first serial register;

serially transferring out the charge groups present in the serial register;

repeating the above steps for the remaining charge groups in the odd memory columns; and repeating all of the above steps for the charge groups stored in the even memory columns.

25. A method for recording, storing and reading out a still image, comprising the steps of:

accumulating a plurality of charges due to incident light, the charges organized into charge groups, a plurality of charge groups formed in respective image cells in a row in an imager array, the imager array having a plurality of rows and columns of image cells;

transferring the charge groups from the image array to a memory array through a multiplexer, having a plurality of multiplexer sections, said step of transferring including the substeps of:

moving the charge groups in each row of image cells into an adjacent row toward the multiplexer; simultaneously transferring the charge groups in a last row of image cells adjacent to the multiplexer into the multiplexer, each charge group being transferred into a corresponding multiplexer section;

within each multiplexer section, arranging each charge group in a predetermined sequential order;

if the charge group within an associated multiplier section originated in an odd row of the image array, serially outputting the charge group in the sequential order from the multiplexer to a first group of cells of a first odd column in the memory array, the number of cells equal to the number of charges in the charge group;

if the image array row from which the charge group originated was an even row, serially outputting the charge group to a first group of cells of a first even column of the memory array.

transferring the current contents of the first group of cells in the first odd column or the first even column to a next number of cells in the first odd or first even column depending upon which column the charge group was serially output;

repeating the above steps until all charge groups have been transferred into the memory array;

reading out the charges stored in the first odd columns; and reading out the charges stored in the even columns.

26. The method of claim 25, wherein said steps of reading out the pixel groups from the odd and even columns in the memory array include the substeps of:

providing a plurality of serial registers equal in number to the number of charges in each charge group, cells of a first serial register coupled to a last row of cells in the memory array, transfer gates disposed between corresponding cells of the serial registers to provide pathways for transferring each charge into a requisite serial register;

clocking a first charge group in each odd column a number of times equal to the number of charges in the group to transfer each charge in the pixel group to a cell in a corresponding serial register;

serially transferring out the first charge groups to outputs of the serial registers;

moving a next charge group in each odd column to the end of the column nearest the serial registers;

transferring a next charge group in each odd column into the serial registers;

repeating said step of transferring charge groups into the serial register and reading out the charge groups from the serial register until charge groups in each of the odd columns have been read out; and repeating the above steps of transferring the charge groups into the serial register and reading out the charge groups from the serial registers for the even columns in the memory array.

* * * * *